United States Patent
Hayashi

(10) Patent No.: US 8,468,303 B2
(45) Date of Patent: Jun. 18, 2013

(54) METHOD AND APPARATUS TO ALLOCATE AREA TO VIRTUAL VOLUME BASED ON OBJECT ACCESS TYPE

(75) Inventor: Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 12/890,825

(22) Filed: Sep. 27, 2010

(65) Prior Publication Data
US 2012/0079188 A1  Mar. 29, 2012

(51) Int. Cl.
*G06F 12/00* (2006.01)

(52) U.S. Cl.
USPC ........... 711/114; 711/156; 711/158; 711/170; 711/217; 714/6.22

(58) Field of Classification Search
USPC .......... 711/114, 156, 170, 158, 217; 714/6.22
See application file for complete search history.

(56) References Cited

U.S. PATENT DOCUMENTS

| | | | |
|---|---|---|---|
| 6,823,442 B1 | 11/2004 | Cameron | |
| 7,761,684 B2 * | 7/2010 | Eguchi | 711/170 |
| 7,930,509 B2 * | 4/2011 | Eguchi | 711/170 |
| 7,966,448 B2 * | 6/2011 | Tamura et al. | 711/112 |
| 8,225,039 B2 * | 7/2012 | Kawaguchi et al. | 711/114 |

* cited by examiner

*Primary Examiner* — Stephen Elmore
(74) *Attorney, Agent, or Firm* — Mattingly & Malur, PC

(57) ABSTRACT

In accordance with an aspect of the invention, a storage system includes a processor; a memory; a disk control module configured to receive a write command for writing to an unallocated area and to identify an object of the write command to be written as a written object; and an object allocation acquisition module configured to obtain object allocation information specifying one or more virtual volume locations for storing the written object. The disk control module allocates, to each of the one or more virtual volume locations, an area selected from a plurality of logical volumes if the written object is predefined as a randomly accessed object. The disk control module allocates to the one or more virtual volume locations a consecutive area of one logical volume if the written object is predefined as a sequentially accessed object.

17 Claims, 12 Drawing Sheets

203 — OBJECT ALLOCATION INFORMATION

| OBJECT NAME (301) | OBJECT ADDRESS (302) | VIRTUAL VOLUME NAME (303) | VIRTUAL VOLUME ADDRESS (304) | |
|---|---|---|---|---|
| TABLE A | 0 - 99 | V-VOL A | 0 - 99 | 305 |
| TABLE A | 100 - 199 | V-VOL A | 100 - 199 | 306 |
| TABLE B | 0 - 99 | V-VOL A | 200 - 299 | 307 |
| TABLE A | 200 - 299 | V-VOL A | 300 - 399 | 308 |
| TABLE B | 100 - 199 | V-VOL A | 400 - 499 | 309 |
| TABLE B | 200 - 299 | V-VOL A | 500 - 599 | 310 |

340 — READ COMMAND

| COMMAND TYPE (341) | VOLUME NAME (342) | VOLUME ADDRESS (343) |
|---|---|---|
| READ | V-VOL A | 100 - 199 |

360 — WRITE COMMAND

| COMMAND TYPE (361) | VOLUME NAME (362) | VOLUME ADDRESS (363) | DATA (364) |
|---|---|---|---|
| WRITE | V-VOL A | 500 - 599 | ABCD |

RAID GROUP INFORMATION

| RAID GROUP NAME (401) | MEDIA NAME (402) | RAID LEVEL (403) | ACCESS TYPE (404) | |
|---|---|---|---|---|
| RG A | HDD A, HDD B, HDD C, HDD D | RAID 5 (3D+1P) | RANDOM | 405 |
| RG B | HDD E, HDD F, HDD G, HDD H | RAID 5 (3D+1P) | RANDOM | 406 |
| RG C | HDD I, HDD J, HDD K, HDD L | RAID 5 (3D+1P) | RANDOM | 407 |
| RG D | HDD M, HDD N, HDD O, HDD P | RAID 5 (3D+1P) | SEQUENTIAL | 408 |
| RG E | HDD Q, HDD R, HDD S, HDD T | RAID 5 (3D+1P) | SEQUENTIAL | 409 |

223

LOGICAL VOLUME INFORMATION

| LOGICAL VOLUME NAME (421) | LOGICAL VOLUME ADDRESS (422) | RAID GROUP NAME (423) | RAID GROUP ADDRESS (424) | |
|---|---|---|---|---|
| L-VOL A | 0 - 999 | RG A | 0 - 999 | 425 |
| L-VOL B | 0 - 999 | RG B | 0 - 999 | 426 |
| L-VOL C | 0 - 999 | RG C | 0 - 999 | 427 |
| L-VOL D | 0 - 999 | RG D | 0 - 999 | 428 |
| L-VOL E | 0 - 999 | RG E | 0 - 999 | 429 |

224

POOL INFORMATION

| POOL NAME (441) | LOGICAL VOLUME NAME FOR RANDOM ACCESS (442) | LOGICAL VOLUME NAME FOR SEQUENTIAL ACCESS (443) | VIRTUAL VOLUME NAME (444) | |
|---|---|---|---|---|
| POOL A | L-VOL A, L-VOL B, L-VOL C | L-VOL D, L-VOL E | V-VOL A | 445 |
| POOL B | L-VOL F, L-VOL G, L-VOL H | L-VOL I, L-VOL J | V-VOL B | 446 |

Fig. 4

225 VIRTUAL VOLUME INFORMATION

| VIRTUAL VOLUME NAME (501) | VIRTUAL VOLUME ADDRESS (502) | LOGICAL VOLUME NAME (503) | LOGICAL VOLUME ADDRESS (504) | |
|---|---|---|---|---|
| V-VOL A | 0 - 99 | L-VOL A | 0 - 99 | 505 |
| V-VOL A | 100 - 199 | L-VOL B | 0 - 99 | 506 |
| V-VOL A | 200 - 299 | L-VOL D | 0 - 99 | 507 |
| V-VOL A | 300 - 399 | L-VOL C | 0 - 99 | 508 |
| V-VOL A | 400 - 499 | L-VOL D | 100 - 199 | 509 |
| V-VOL B | 0 - 99 | NOT ALLOCATED | NOT ALLOCATED | 510 |

226 ACCESS TYPE DEFINITION INFORMATION

| OBJECT NAME (521) | ACCESS TYPE (522) | |
|---|---|---|
| TABLE A | RANDOM | 523 |
| TABLE B | SEQUENTIAL | 524 |
| INDEX A | RANDOM | 525 |

227 OBJECT ASSIGNMENT INFORMATION

| OBJECT NAME (541) | RAID GROUP NAME (542) | ASSIGNED CAPACITY (543) | |
|---|---|---|---|
| TABLE A | RG A | 100 | 544 |
| TABLE A | RG B | 100 | 545 |
| TABLE A | RG C | 100 | 546 |
| INDEX A | RG A | 300 | 547 |
| INDEX A | RG B | 300 | 548 |
| INDEX A | RG C | 200 | 549 |

Fig. 5

METHOD AND APPARATUS TO ALLOCATE AREA TO VIRTUAL VOLUME BASED ON OBJECT ACCESS TYPE

BACKGROUND OF THE INVENTION

The present invention relates generally to storage systems with thin provisioning and, more particularly, to the allocation of an area of logical volume to a virtual volume.

In recent years, thin provisioning has become popular. Thin provisioning is a method for allocating an area to a virtual volume when a storage subsystem receives a write command to an unallocated area. Existing methods allow a thin provisioning function to allocate an area randomly selected from several logical volumes to a virtual volume. Therefore, sequential access will become random access. When the storage subsystem receives sequential read command to consecutive areas, the response time will increase because the storage subsystem accesses randomly distributed areas and each HDD seeks a target sector. Sequential access performance will decrease. On the other hand, if the thin provisioning function allocates an area sequentially selected from one logical volume to a virtual volume, a lot of random accesses go to only the logical volume. Random access performance will decrease. An example for managing virtual volumes in a utility storage server system is found in U.S. Pat. No. 6,823,442.

BRIEF SUMMARY OF THE INVENTION

Exemplary embodiments of the invention provide a disk control program that allocates an area having portions selected from several logical volumes or a consecutive area of one logical volume based on predefined information when the disk control program receives a write command to an unallocated area. According to a first embodiment, an object allocation acquisition program obtains object allocation information. The disk control program identifies a written object when the disk control program receives a write command to an unallocated area. The disk control program allocates an area having portions selected from several logical volumes when the written object is predefined as a randomly accessed object. The disk control program allocates a consecutive area of one logical volume when the written object is predefined as a sequentially accessed object. According to a second embodiment, the disk control program identifies a target volume when the disk control program receives a write command to an unallocated area. The disk control program allocates an area having portions selected from several logical volumes when the target volume is predefined as a randomly accessed volume. The disk control program allocates a consecutive area of one logical volume when the target volume is predefined as a sequentially accessed volume.

In accordance with an aspect of the present invention, a storage system comprises a processor; a memory; a disk control module configured to receive a write command for writing to an unallocated area and to identify an object of the write command to be written as a written object; and an object allocation acquisition module configured to obtain object allocation information specifying one or more virtual volume locations for storing the written object. The disk control module allocates, to each of the one or more virtual volume locations, an area selected from a plurality of logical volumes if the written object is predefined as a randomly accessed object. The disk control module allocates to the one or more virtual volume locations a consecutive area of one logical volume if the written object is predefined as a sequentially accessed object.

In some embodiments, the disk control program is configured to update virtual volume information correlating one or more logical volume locations of the allocated area with the one or more virtual volume locations for storing the written object. The one or more logical volume locations include a logical volume name and one or more logical volume addresses, and wherein the one or more virtual volume locations include a virtual volume name and one or more virtual volume addresses. The disk control program is configured to obtain the one or more virtual volume locations for storing the written object from the object allocation information; obtain one or more logical volume locations corresponding to the obtained one or more virtual volume locations based on virtual volume information; obtain one or more RAID group names and addresses corresponding to the obtained one or more logical volume locations based on logical volume information; obtain a media name corresponding to the obtained one or more RAID group names and addresses based on RAID group information; and write data of the write command to media corresponding to the obtained media name.

In specific embodiments, the disk control program is configured to obtain the one or more virtual volume locations for storing the written object from the object allocation information, obtain one or more logical volume locations corresponding to the one or more virtual volume locations based on virtual volume information, and obtain one or more RAID group names and addresses corresponding to the obtained one or more logical volume locations based on logical volume information. If the written object is predefined as a randomly accessed object, then for the area to be allocated to each one of the one or more virtual volume locations, the disk control module selects from the one or more RAID group names and addresses a RAID group which has a least amount of assigned capacity, selects a logical volume which is associated with the selected RAID group, and allocates a portion of the selected logical volume as the selected area to the one virtual volume location. If the written object is predefined as a sequentially accessed object and if the disk control module finds a virtual volume name and virtual volume address of an adjacent previous address of an object address of the written object, the disk control program obtains the virtual volume name and virtual volume address of the adjacent previous address from the object allocation information, obtains a logical volume name and a logical volume address allocated to the virtual volume name and the virtual volume address of the adjacent previous address, obtains an adjacent subsequent address of the logical volume address of the adjacent previous address, and allocates an area of the adjacent subsequent address as the consecutive area of one logical volume to the one or more virtual volume locations for storing the written object. If the written object is predefined as a sequentially accessed object and if the disk control module does not find a virtual volume name and virtual volume address of an adjacent previous address of an object address of the written object, the disk control program allocates an area of a logical volume of a RAID group for which an access type is SEQUENTIAL.

In some embodiments, the storage system further comprises a move module. An access type of the written object is changed to a changed object from a randomly accessed object to a sequentially accessed object or from a sequentially accessed object to a randomly accessed object. If the access type of the changed object is changed from a sequentially accessed object to a randomly accessed object, the changed object has an object name and a plurality of object addresses, and for each object address of the object addresses of the changed object, the move module obtains the virtual volume name and the virtual volume address corresponding to the object name and the object address of the changed object, obtains the logical volume name and the logical volume address corresponding to the obtained virtual volume name and the virtual volume address, obtains one or more RAID group names and addresses corresponding to the obtained logical volume name and the logical volume address, selects from the one or more RAID group names and addresses a RAID group which has a least amount of assigned capacity, selects a logical volume for random access which is associated with the selected RAID group, and moves data from an area associated with the obtained logical volume name and the logical volume address of the changed object to the selected logical volume for random access. If the access type of the changed object is changed from a randomly accessed object to a sequentially accessed object, the move module selects a RAID group for which the access type is SEQUENTIAL, selects a logical volume for which a RAID group name is associated with the selected RAID group, obtains a source address of the changed object based on the object allocation information and on virtual volume information which correlates virtual volume name and address with logical volume name and address, and moves data from the source address to the selected logical volume.

In accordance with another aspect of this invention, a storage system comprises a processor; a memory; a disk control module configured to receive a write command for writing to an unallocated area and to identify a target volume for an object of the write command to be written as a written object; and an object allocation acquisition module configured to obtain object allocation information specifying one or more virtual volume locations for storing the written object. The disk control module allocates, to each of the one or more virtual volume locations, an area selected from a plurality of logical volumes if the target volume is predefined as a randomly accessed volume. The disk control module allocates to the one or more virtual volume locations a consecutive area of one logical volume if the target volume is predefined as a sequentially accessed volume.

In accordance with another aspect of the invention, a storage system comprises a processor; a memory; a disk control module configured to receive a write command for writing to an unallocated area, and to identify an object of the write command to be written as a written object or a target volume for an object of the write command to be written as a written object; and an object allocation acquisition module configured to obtain object allocation information specifying one or more virtual volume locations for storing the written object. If the disk control module identifies a written object of the write command, the disk control module allocates to the one or more virtual volume locations an area having portions selected from a plurality of logical volumes if the written object is predefined as a randomly accessed object, and allocates to the virtual volume location a consecutive area of one logical volume if the written object is predefined as a sequentially accessed object. If the disk control module identifies a written object of the write command, the disk control module allocates, to each of the one or more virtual volume locations, an area selected from a plurality of logical volumes if the written object is predefined as a randomly accessed object, and the disk control module allocates to the one or more virtual volume locations a consecutive area of one logical volume if the written object is predefined as a sequentially accessed object. If the disk control module identifies a target volume for a written object of the write command, the disk control module allocates, to each of the one or more virtual volume locations, an area selected from a plurality of logical volumes if the target volume is predefined as a randomly accessed volume, and the disk control module allocates to the one or more virtual volume locations a consecutive area of one logical volume if the target volume is predefined as a sequentially accessed volume.

In some embodiments, if the disk control module identifies a written object of the write command, then the disk control program is configured to obtain the one or more virtual volume locations for storing the written object from the object allocation information, obtain one or more logical volume locations corresponding to the obtained one or more virtual volume locations based on virtual volume information, and obtain one or more RAID group names and addresses corresponding to the obtained one or more logical volume locations based on logical volume information.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of the object allocation information in the storage subsystem of FIG. 1, a read command, and a write command.

FIG. 4 shows an example of the RAID group information, the logical volume information, and the pool information.

FIG. 5 shows an example of the virtual volume information, the access type definition information, and the object assignment information according to the first embodiment.

DETAILED DESCRIPTION OF THE INVENTION

Figure 1:
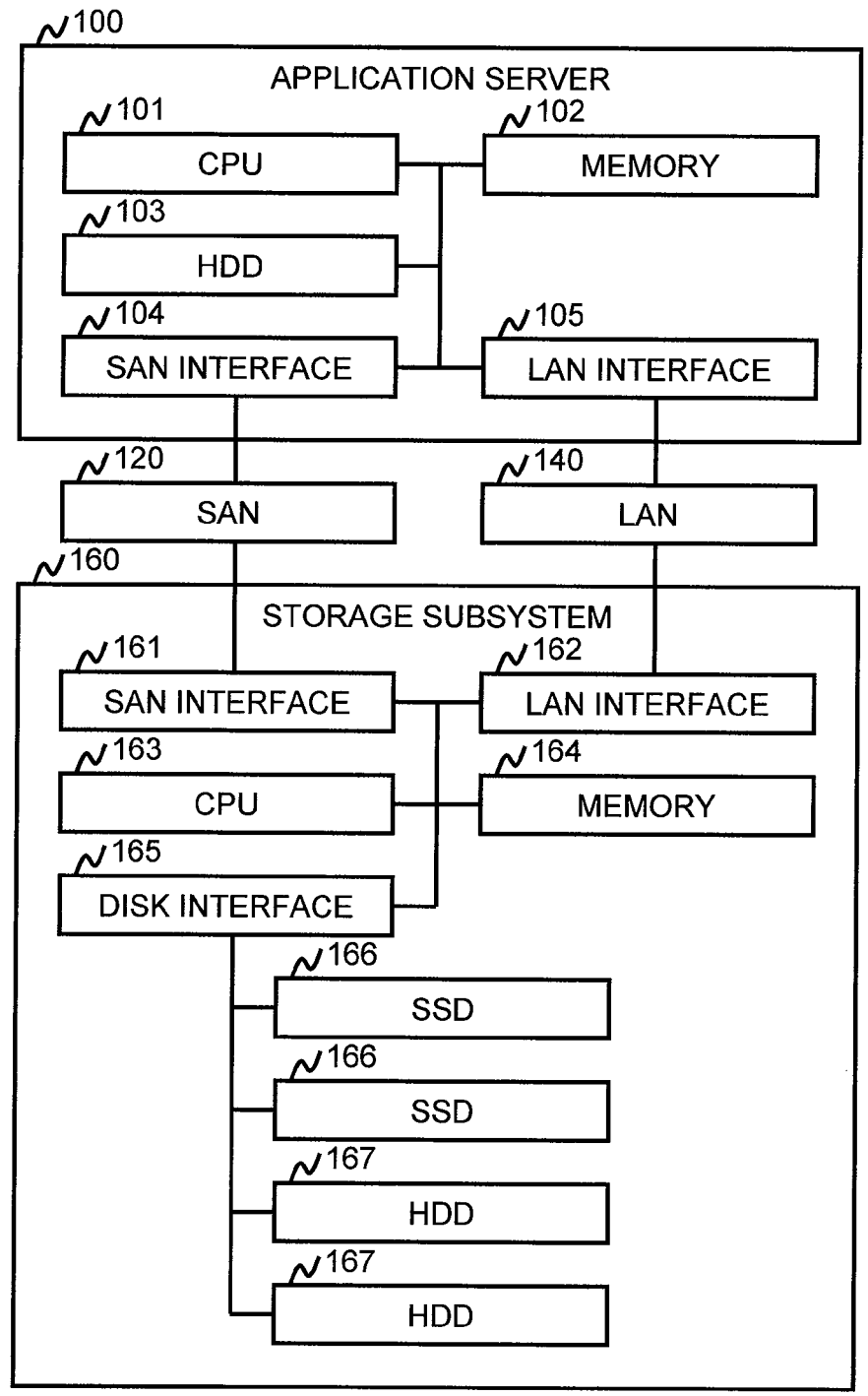
FIG. 1 illustrates an example of a hardware configuration of an information system in which the method and apparatus of the invention may be applied

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for the allocation of an area of logical volume to a virtual volume based on object access type.

First Embodiment: Object-Based Access Type Management System Configuration

FIG. 1 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105. The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The LAN interface 105 connects the application server 100 and the LAN 140. The SAN 120 connects the application server 100 and the storage subsystem 160. The application server 100 uses the SAN 120 to send application data to the storage subsystem 160 and receive application data from the storage subsystem 160. The application server 100 uses the LAN 140 to send management data to the storage subsystem 160 and receive management data from the storage subsystem 160. The LAN 140 connects the application server 100 and the storage subsystem 160. The storage subsystem 160 comprises a SAN interface 161, a LAN interface 162, a CPU 163, a memory 164, a disk interface 165, a SSD (Solid State Drive) 166, and a HDD 167. The SAN interface 161 connects the storage subsystem 160 and the SAN 120. The LAN interface 162 connects the storage subsystem 160 and the LAN 140. The CPU 163 reads programs from the memory 164 and executes the programs. The memory 164 reads programs and data from the HDD 167 and SSD 166 when the storage subsystem 160 starts and stores the programs and the data. The disk interface 165 connects the storage subsystem 160, the SSD 166, and the HDD 167. The SSD 166 stores programs and data. The HDD 167 stores programs and data.

Figure 2:
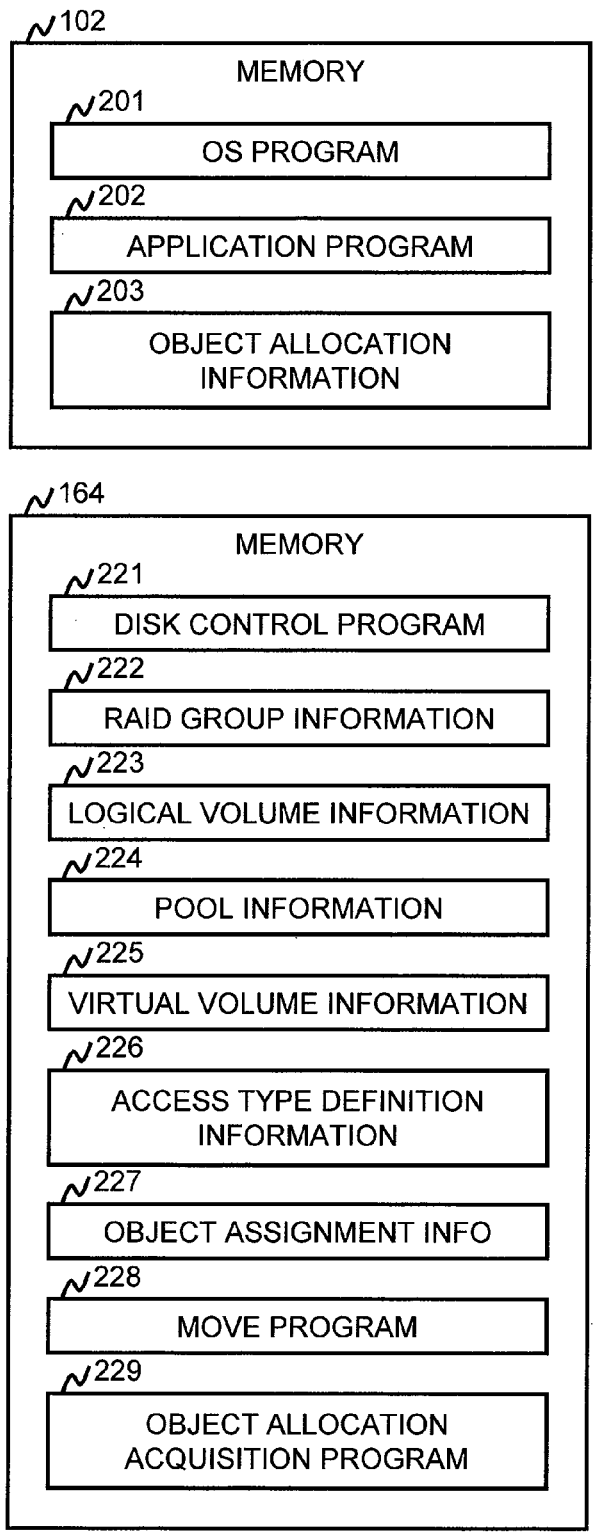
FIG. 2 illustrates an example of the memory in the application server and the memory in the storage subsystem of FIG. 1.

FIG. 2 illustrates an example of the memory 102 in the application server 100 and the memory 164 in the storage subsystem 160 of FIG. 1. The memory 102 comprises an OS (Operating System) program 201, an application program 202, and object allocation information 203. The OS program 201 executes the application program 202. The application program 202 (e.g., database program) reads data from the storage subsystem 160, processes data, writes the results to the storage subsystem 160, and manages the object allocation information 203. The object allocation information 203 includes a location where an object is saved.

The memory 164 comprises a disk control program 221, RAID (Redundant Arrays of Inexpensive (or Independent) Disks) group information 222, logical volume information 223, pool information 224, virtual volume information 225, access type definition information 226, object assignment information or allocation information 227, a move program 228, and an object allocation acquisition program 229. The disk control program 221 receives a read command and a write command from the application server 100, reads data from the SSD 166 and the HDD 167, and writes data to the SSD 166 and the HDD 167 using the RAID group information 222, the logical volume information 223, the pool information 224, the virtual volume information 225, and the access type definition information 226. The move program 228 moves data to some other area.

FIG. 3 illustrates an example of the object allocation information 203 in the storage subsystem 160 of FIG. 1, a read command 340, and a write command 360. The object allocation information 203 of FIG. 3 is a table and includes columns of an object name 301, an object address 302, a virtual volume name 303, and a virtual volume address 304. For example, the row 305 shows that the address from "0" to "99" in "TABLE A" is allocated to the address from "0" to "99" in "V-VOL A."

The read command 340 includes a command type 341, a volume name 342, and a volume address 343. The read command 340 is sent from the application program 202 to the disk control program 221. The write command 360 includes a command type 361, a volume name 362, a volume address 363, and data 364. The write command 360 is sent from the application program 202 to disk control program 221.

FIG. 4 shows an example of the RAID group information 222, the logical volume information 223, and the pool information 224.

The RAID group information 222 includes columns of a RAID group name 401, a media name 402, a RAID level 403, and an access type 404. For example, the row 405 shows that "RG A" has "HDD A," "HDD B," "HDD C," and "HDD D," the RAID level of "RG A" is "RAID 5 (3D+1P)," and "RG A" is used for random access.

The logical volume information 223 includes columns of a logical volume name 421, a logical volume address 422, a RAID group name 423, and a RAID group address 424. For example, the row 425 shows that "L-VOL A" is allocated to the address from "0" to "999" in "RG A."

The pool information 224 includes columns of a pool name 441, a logical volume name for random access 442, a logical volume name for sequential access 443, and a virtual volume name 444. For example, the row 445 shows "POOL A" has "L-VOL A", "L-VOL B," and "L-VOL C" for random access and "L-VOL D" and "L-VOL E" for sequential access, and the area of "POOL A" is used by "V-VOL A."

FIG. 5 shows an example of the virtual volume information 225, the access type definition information 226, and the object assignment information 227 according to the first embodiment.

The virtual volume information 225 includes columns of a virtual volume name 501, a virtual volume address 502, a logical volume name 503, and a logical volume address 504. For example, the row 505 shows that the address from "0" to "99" in "V-VOL A" is allocated to the address from "0" to "99" in "L-VOL A."

The access type definition information 226 includes columns of an object name 521 and an access type 522. For example, the row 523 shows "TABLE A" is accessed randomly and the row 524 shows "TABLE B" is accessed sequentially.

The object assignment information 227 includes columns of an object name 541, a RAID group name 542, and assigned capacity 543. The RAID group name 542 shows a list of RG names for which the access type 404 is only "RANDOM" in the RAID group information 222. For example, the row 544 shows "TABLE A" is assigned with an area in "RG A" and the assigned capacity is 100 bytes.

Figure 6:
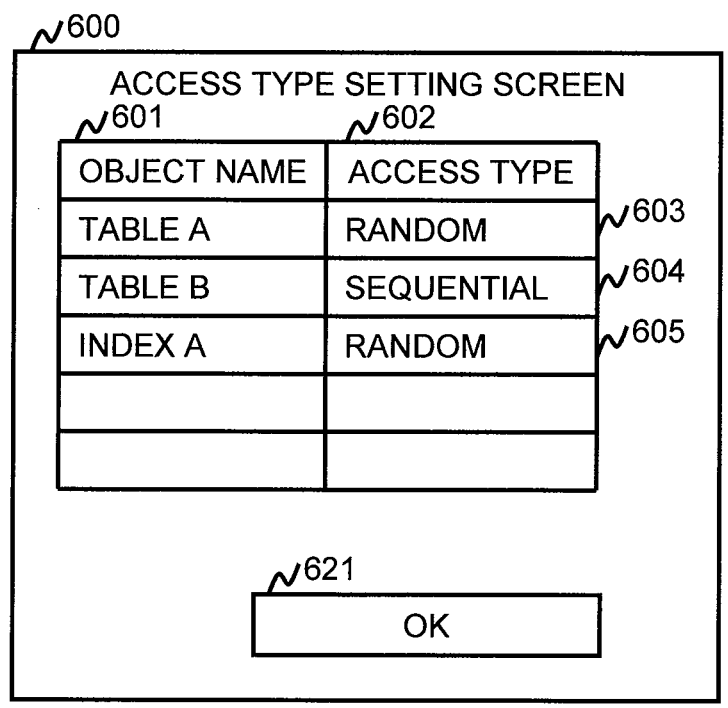
FIG. 6 shows an example of an access type setting screen according to the first embodiment.

FIG. 6 shows an example of an access type setting screen 600 according to the first embodiment. An administrator inputs an object name 601 and an access type 602. The access type definition information 226 is updated to the data input by the administrator when the administrator pushes an "OK" button 621.

Figure 7:
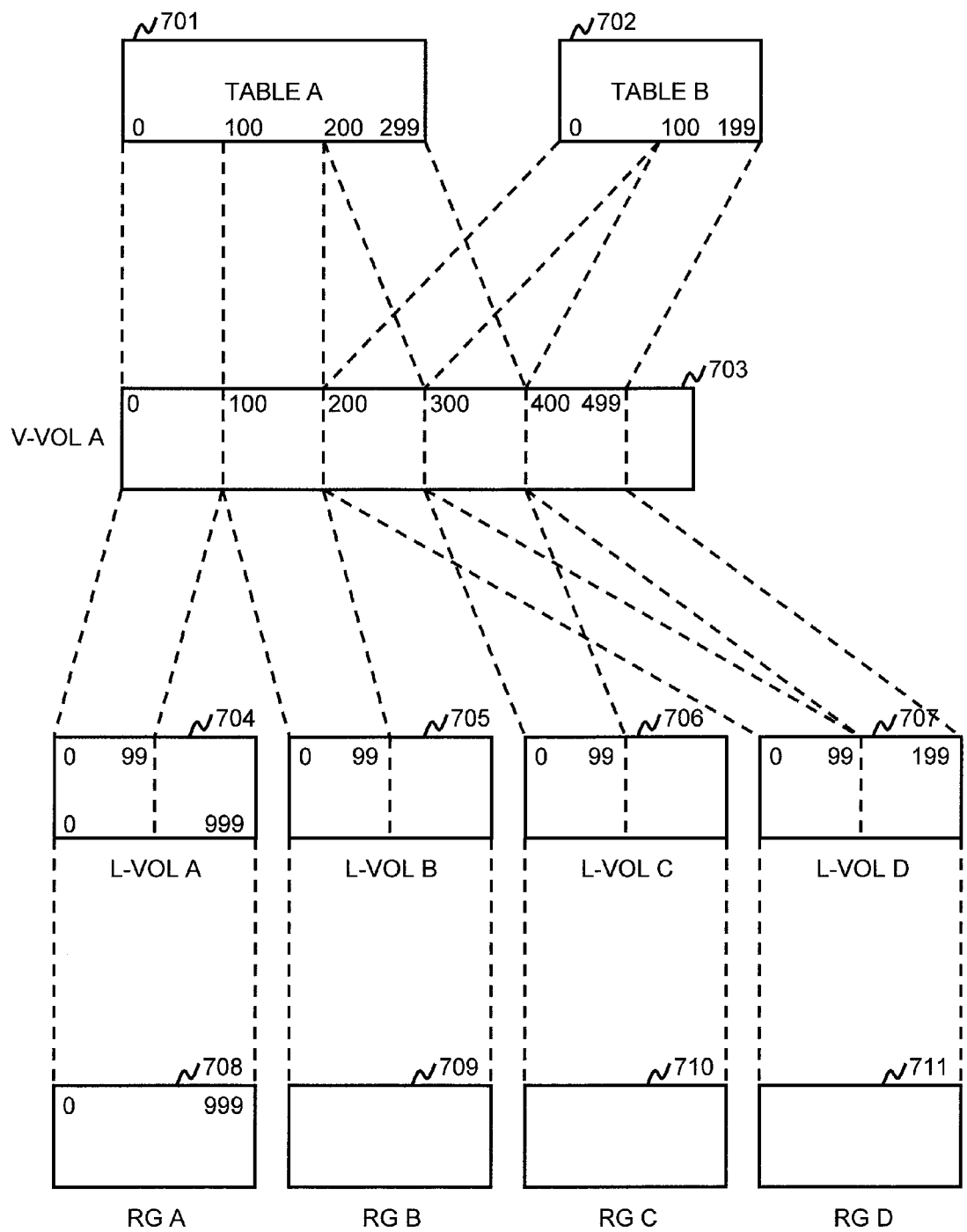
FIG. 7 shows an example of a diagram illustrating relationships between table and virtual volume, virtual volume and logical volume, and logical volume and RAID group.

FIG. 7 shows an example of a diagram illustrating relationships between table and virtual volume, virtual volume and logical volume, and logical volume and RAID group. FIG. 7 shows TABLE A 701, TABLE B 702, V-VOL A 703, L-VOL A 704, L-VOL B 705, L-VOL C 706, L-VOL D 707, RG A 708, RG B 709, RG C 710, and RG D 711. For example, the address "0" to "99" in the TABLE A 701 is mapped to the address "0" to "99" in the V-VOL A 703, the address "0" to "99" in the V-VOL A 703 is mapped to the address "0" to "99" in the L-VOL A 704, and the address "0" to "999" in the L-VOL A 704 is mapped to the address "0" to "999" in the RG A 708. FIG. 7 shows object assignment for randomly accessed object amongst L-VOL A and RG A, L-VOL B AND RG B, and L-VOL C and RG C. FIG. 7 further shows object assignment for sequentially accessed object to L-VOL D and RG D.

Process Flows

Figure 8:
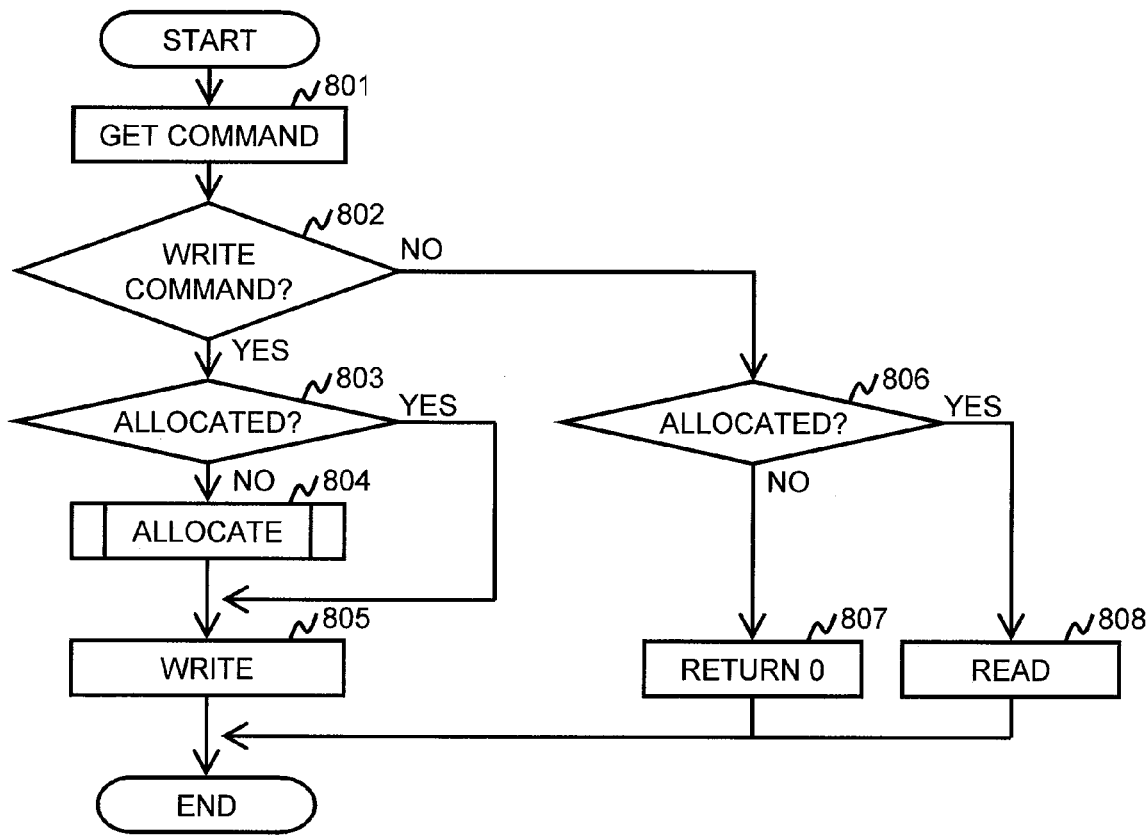
FIG. 8 is an example of a flow diagram showing that the storage subsystem reads data from the SSD and the HDD, and writes data to the SSD and the HDD when the storage subsystem receives the read command or the write command from the application server.

FIG. 8 is an example of a flow diagram showing that the storage subsystem 160 reads data from the SSD 166 and the HDD 167, and writes data to the SSD 166 and the HDD 167 when the storage subsystem 160 receives the read command 340 or the write command 360 from the application server 100.

In step 801, the disk control program 221 receives the read command 340 or the write command 360 from the application server 100. In decision step 802, if the command that the disk control program 221 received in step 801 is the write command 360, then the process goes to decision step 803; if not, then the process goes to decision step 806. In decision step 803, if the volume name 362 and the volume address 363 are allocated in the virtual volume information 225, then the process goes to step 805; if not, then the process goes to step 804.

In step 804, the disk control program 221 allocates an area and updates the virtual volume information 225. In step 805, the disk control program 221 gets the volume name 362 and the volume address 363 from the write command 360, gets the logical volume name 503 and the logical volume address 504 from the virtual volume information 225, gets the RAID group name 423 and the RAID group address 424 from the logical volume information 223, gets the media name 402 from the RAID group information 222, and writes the data 364 the SSD 166 and the HDD 167.

In decision step 806, if the volume name 342 and the volume address 343 are allocated in the virtual volume information 225, then the process goes to step 808; if not, then the process goes to step 807. In step 807, the disk control program 221 returns "0" to the application server 100 because the area specified by the volume name 342 and the volume address 343 is not one to which data is written. In step 808, the disk control program 221 gets the volume name 342 and the volume address 343 from the read command 340, gets the logical volume name 503 and the logical volume address 504 from the virtual volume information 225, gets the RAID group name 423 and the RAID group address 424 from the logical volume information 223, gets the media name 402 from the RAID group information 222, and reads data from the SSD 166 and the HDD 167.

Figure 9:
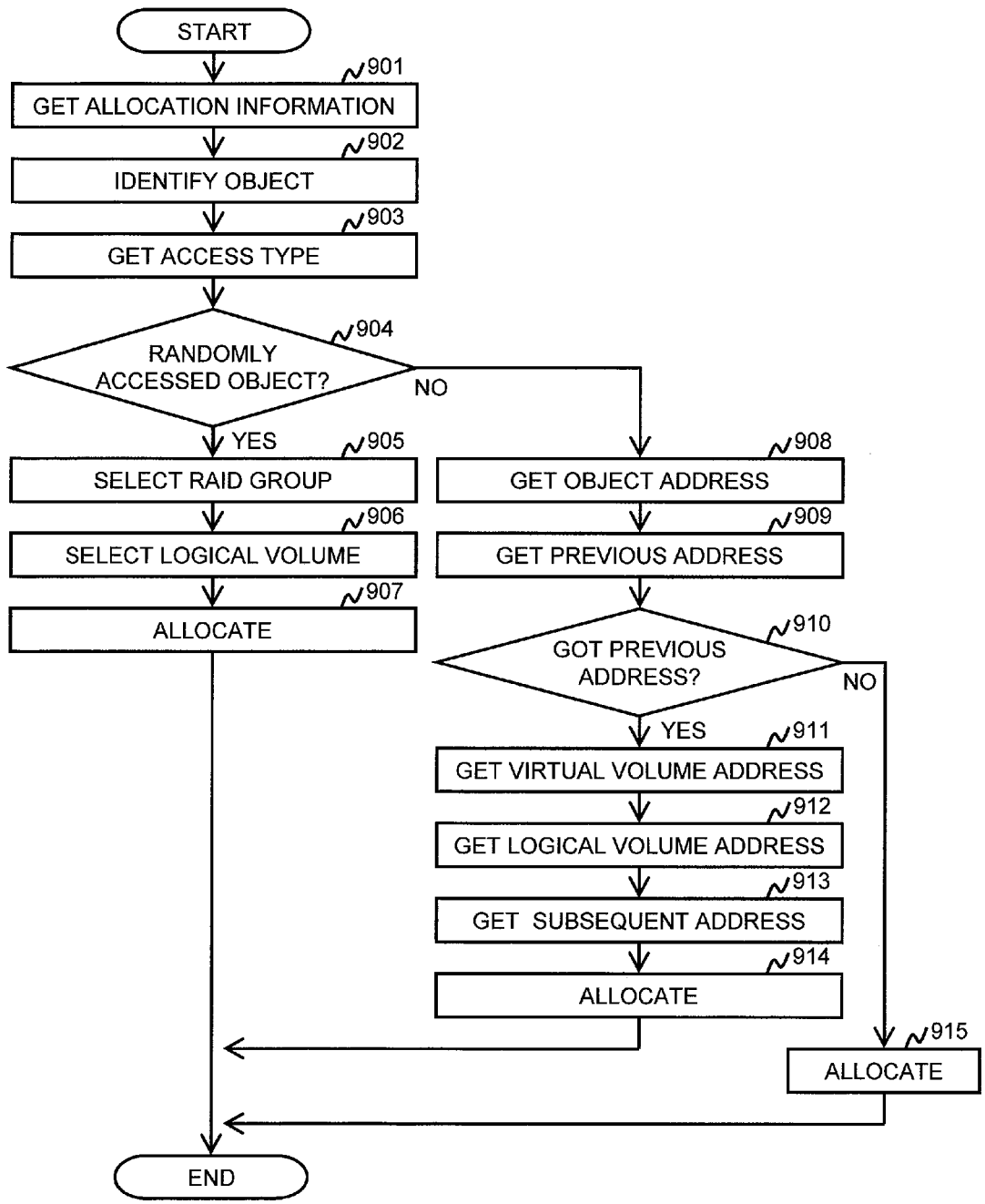
FIG. 9 is an example of a flow diagram showing the disk control program allocates an area of a virtual volume to an unallocated area in step 804 of FIG. 8 according to the first embodiment.

FIG. 9 is an example of a flow diagram showing the disk control program 221 allocates an area of a virtual volume to an unallocated area in step 804 of FIG. 8 according to the first embodiment.

In step 901, the object allocation acquisition program 229 gets the object allocation information 203 from the application server 100. In step 902, the disk control program 221 identifies the object to which the data 364 is written from the volume name 362, the volume address 363, and the object allocation information 203. For example, the volume name 362 is "V-VOL A" and the volume address 363 is "300" to "399" and the area "300" to "399" of "L-VOL A" corresponds to the address "200" to "299" of "TABLE A." Therefore, the data 364 is written to "TABLE A." In step 903, the disk control program 221 gets the access type 522 from the object name which is identified in step 902 and the access type definition information 226. For example, the object name which is identified in step 902 is "TABLE A." The access type 522 of "TABLE A" is "RANDOM" from the row 523 in the access type definition information 226. In decision step 904, if the access type 522 which the disk control program 221 gets in step 903 is "RANDOM," then the process goes to step 905; if not, the process goes to step 908.

In step 905, the disk control program 221 selects a RAID group to allocate an area to a virtual volume. The disk control program 221 selects a RAID group that has the least amount of assigned capacity 543 among the objects associated with the object name 541 identified in step 902. For example, when identified object name is "INDEX A" in step 902, "RG C" is the least assigned capacity among "RG A," "RG B," and "RG C." In step 906, the disk control program 221 selects a logical volume to allocate an area to a virtual volume. The disk control program 221 selects the logical volume name 421 for the logical volume which is associated with the RAID group under the RAID group name 423 selected in step 905. For example, when "RG C" is selected in step 905, the disk control program 221 selects "L-VOL C." In step 907, the disk control program 221 allocates an area of the logical volume that is selected in step 906 to the virtual volume that is specified by the volume name 362 and the volume address 363, and updates the virtual volume information 225.

The selection of a RAID group that has the least amount of assigned capacity in step 905 ensures that data is written approximately evenly across the RAID groups and corresponding logical volumes. As such, the disk control program 221 allocates to the virtual volumes approximately evenly from the logical volumes. For a randomly accessed object to be stored in one or more virtual volume locations (i.e., a virtual volume name and one or more virtual volume addresses), the area to be allocated to each one of the virtual volume locations is selected from one of the logical volumes. Steps 905 to 907 are performed for each one of the virtual volume locations.

In step 908, the disk control program 221 gets the object name 301 and the object address 302 from the write command 360 and the object allocation information 203. For example, the volume name 362 is "V-VOL A" and the volume address 363 is "500" to "599," and hence the object name 301 is "TABLE B" and the object address 302 is "200" to "299." In step 909, the disk control program 221 gets the adjacent previous address of the object address obtained in step 908. For example, the object name obtained in step 908 is "TABLE B" and the object address obtained in step 908 is "200" to "299," and thus the adjacent previous address is "100" to "199." In decision step 910, if the disk control program 221 finds the virtual volume name 303 and the virtual volume address 304 of the adjacent previous address, then the process goes to step 911; if not, the process goes to step 915. In step 911, the disk control program 221 gets the virtual volume name 303 and the virtual volume address 304 of the adjacent previous address obtained in step 909 from the object allocation information 203. For example, the adjacent previous address obtained in step 909 is "100" to "199," and hence the virtual volume name 303 is "V-VOL A" and the virtual volume address 304 is "400" to "499." In step 912, the disk control program 221 gets the logical volume name 503 and the logical volume address 504 allocated to the virtual volume and the virtual volume address obtained in step 911 from the virtual volume information 225. For example, the virtual volume name 303 is "V-VOL A" and the virtual volume address 304 is "400" to "499" obtained in step 911, and thus the logical volume name 503 is "L-VOL D" and the logical volume address 504 is "100" to "199." In step 913, the disk control program 221 gets the adjacent subsequent address of the logical volume address obtained in step 912. For example, the logical volume name 503 is "L-VOL D" and the logical volume address 504 is "100" to "199" obtained in step 912; therefore, the subsequent address is "200" to "299." In step 914, the disk control program 221 allocates the area obtained in step 913 to the virtual volume specified by the volume name 362 and the volume address 363. In step 915, the disk control program 221 allocates an area of a logical volume of a RAID group that has the access type 404 of "SEQUENTIAL."

Figure 10:
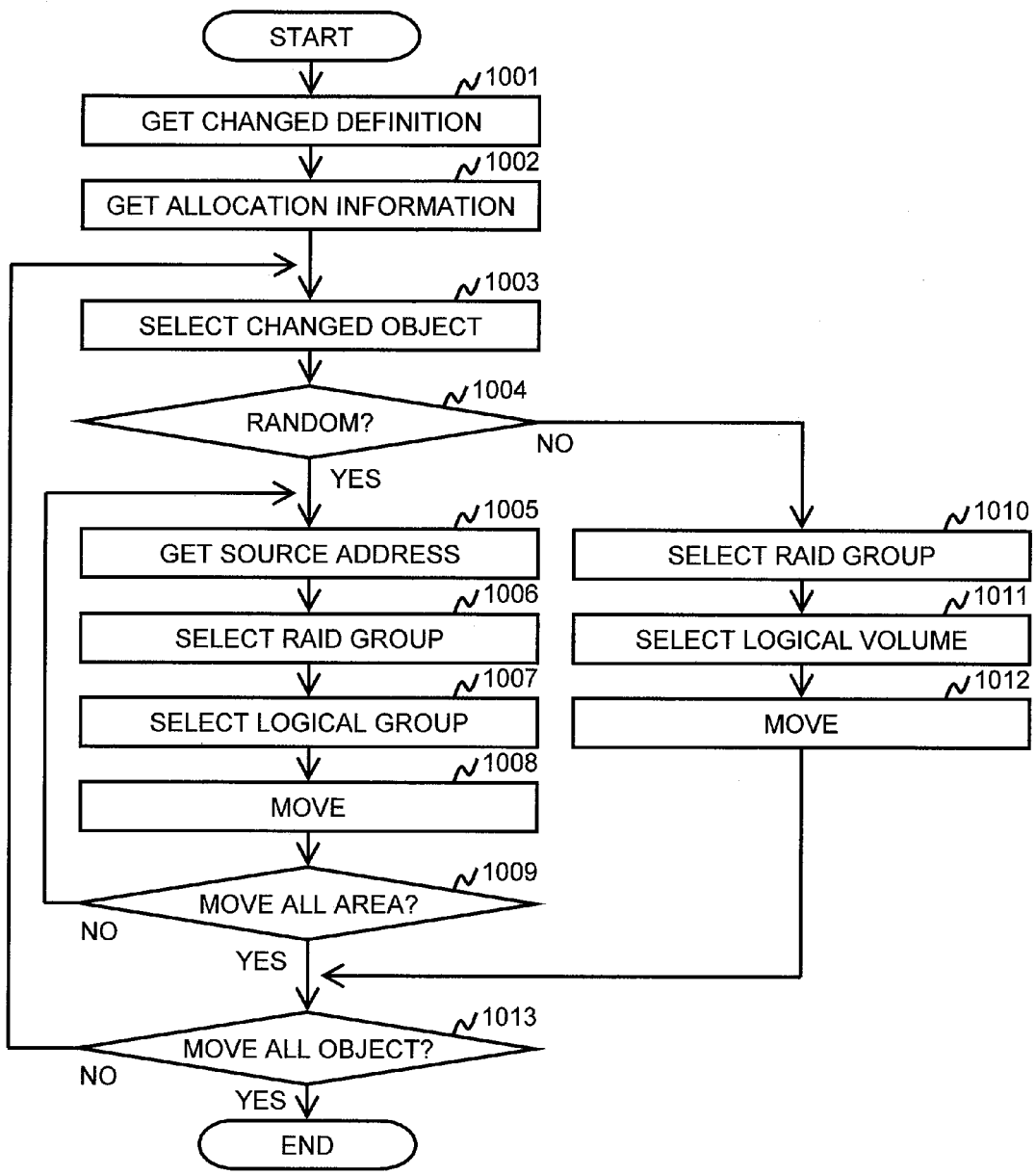
FIG. 10 is an example of a flow diagram showing a process when the access type definition information is changed using the access type setting screen.

FIG. 10 is an example of a flow diagram showing a process when the access type definition information 226 is changed using the access type setting screen 600. In step 1001, the move program 228 updates the access type definition information 226 with changed information from the access type setting screen 600. In step 1002, the move program 228 gets the object allocation information 203 from the application server 100. In step 1003, the move program 228 selects a changed object from the access type definition information 226. In decision step 1004, if the access type 522 of the object selected in step 1003 is changed from "SEQUENTIAL" to "RANDOM," then the process goes to step 1005; if not, then the process goes to step 1010.

In step 1005, the move program 228 selects a row in which the object name 301 is for the object selected in step 1003 in the object allocation information 203, selects a row in which the virtual volume name 501 and the virtual volume address are the same as the virtual volume name 303 and the virtual volume address 304 selected in this step, and gets the logical volume name 503 and the logical volume address 504 selected in this step from the virtual volume information 225. For example, when the access type 522 of "TABLE B" is changed from "SEQUENTIAL" to "RANDOM," the move program 228 selects the row 307 from the object allocation information 203, selects the row 507 from the virtual volume information 225, and gets the logical volume name 503 which is "L-VOL D" and the logical volume address 504 which is "0" to "99." In step 1006, the move program 228 selects a RAID group for random access. The move program 228 selects a RAID group that has the least amount of assigned capacity 543 among the objects associated with the object name 541 selected in step 1003. For example, when the selected object name is "INDEX A" in step 1003, "RG C" is the least assigned capacity among "RG A," "RG B," and "RG C." In step 1007, the move program 228 selects a logical volume for random access. The move program 228 selects the logical volume name 421 for which the RAID group name 423 is associated with the RAID group that is selected in step 1006. For example, when "RG C" is selected in step 1006, the disk control program 221 selects "L-VOL C." In step 1008, the move program 228 moves data from the area selected in step 1005 to the area selected in step 1007 and updates the virtual volume information 225. In step 1009, if the move program 228 moves the object selected in step 1003, then the process goes to step 1013; if not, then the process goes to step 1005.

In step 1010, the move program 228 selects a RAID group for which the access type 404 is "SEQUENTIAL." In step 1011, the move program 228 selects a logical volume for which the RAID group name 423 is associated with the RAID group selected in step 1010. In step 1012, the move program 228 gets the source address of the object selected in step 1003 from the object allocation information 203 and the virtual volume information 225, moves data from the source address to the logical volume selected in step 1011, and updates the virtual volume information 225. The process continues to step 1013.

In decision step 1013, if all changed objects are moved, then the process ends; if not, then the process goes to step 1003.

Second Embodiment: Volume-Based Access Type Management

The following description of the second embodiment focuses on only the differences from the first embodiment.

System Configuration

Figure 11:
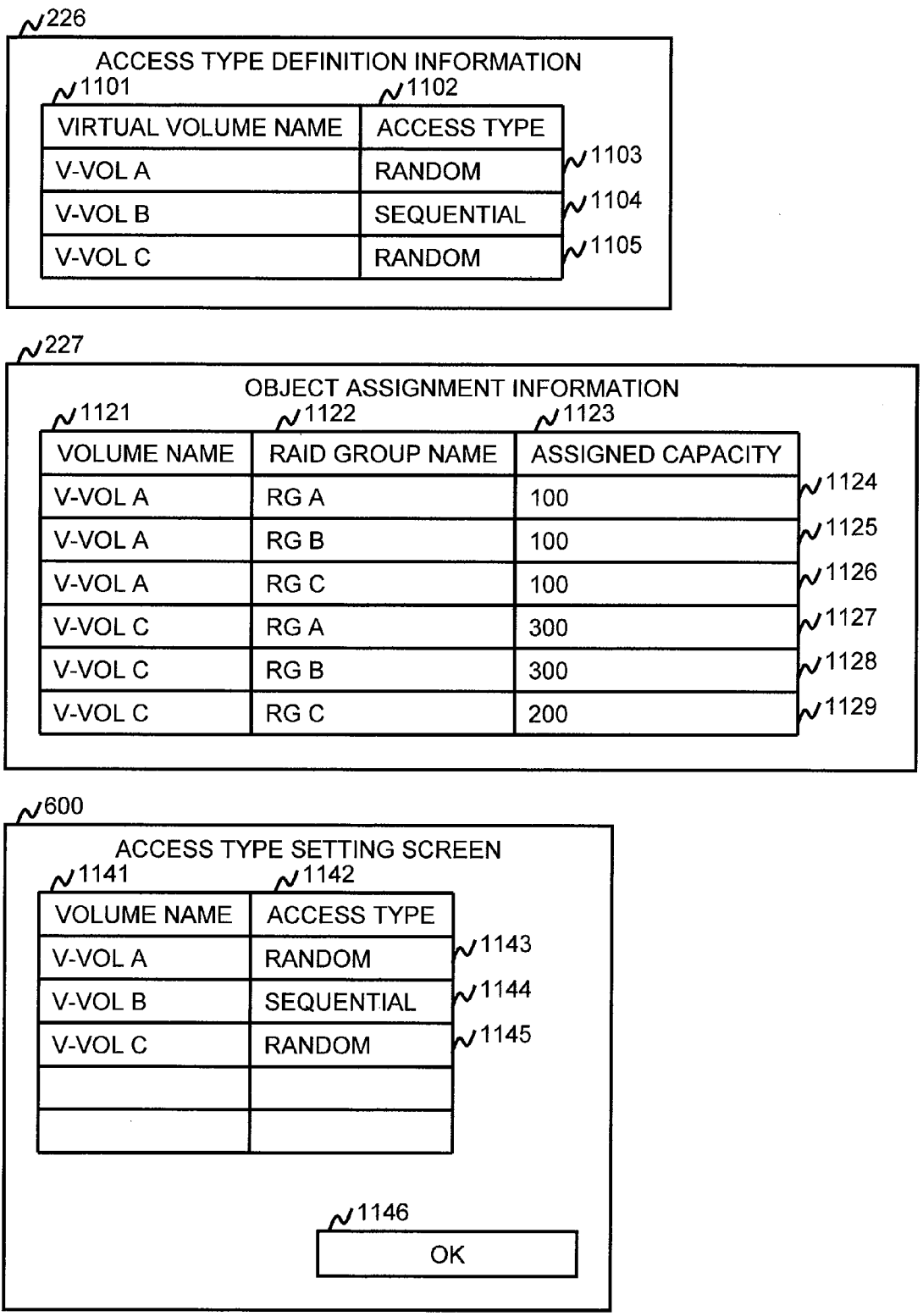
FIG. 11 illustrates an example of the access type definition information, the object assignment information, and the access type setting screen according to the second embodiment.

FIG. 11 illustrates an example of the access type definition information 226, the object assignment information 227, and the access type setting screen 600 according to the second embodiment.

The access type definition information 226 includes columns of a virtual volume name 1101 and an access type 1102. For example, the row 1103 shows "V-VOL A" is accessed randomly and the row 1104 shows "V-VOL B" is accessed sequentially. The object assignment information 227 includes columns of a virtual volume name 1121, a RAID group name 1122, and assigned capacity 1123. The RAID group name 1122 shows a list of RG names for which the access type 404 is only "RANDOM" in the RAID group information 222. For example, the row 1124 shows "V-VOL A" is assigned with an area in "RG A" and the assigned capacity is 100 bytes. An administrator inputs a virtual volume name 1141 and an access type 1142 on the access type setting screen 600. The access type definition information 226 is updated to the data input by the administrator when the administrator pushes an "OK" button 1146.

Process Flows

Figure 12:
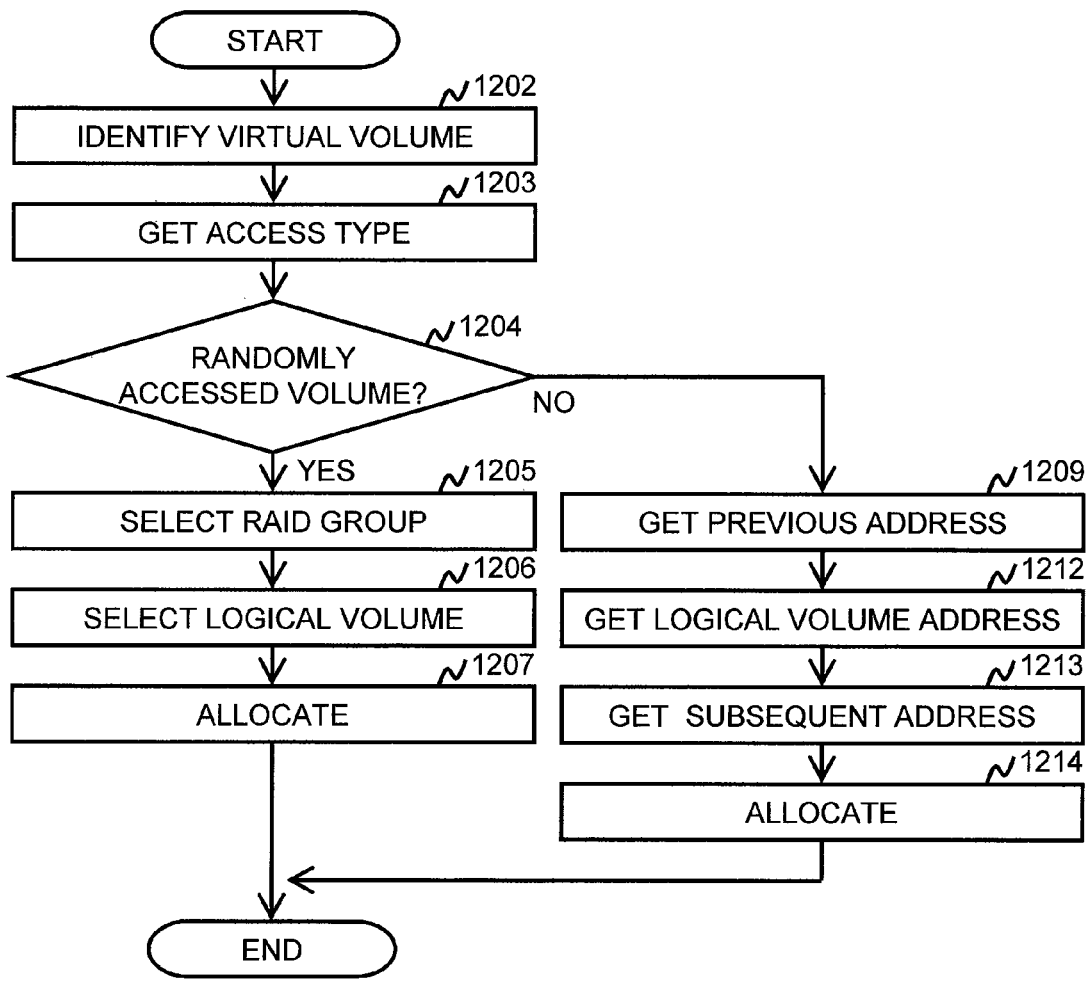
FIG. 12 is an example of a flow diagram showing the disk control program allocates an area of a virtual volume to an unallocated area in step 804 of FIG. 8 according to second embodiment.

FIG. 12 is an example of a flow diagram showing the disk control program 221 allocates an area of a virtual volume to an unallocated area in step 804 of FIG. 8 according to second embodiment.

In step 1202, the disk control program 221 identifies the virtual volume to which the data 364 is written from the volume name 362. In step 1203, the disk control program 221 gets the access type 1102 from the virtual volume name which is identified in step 1202 and the access type definition information 226. For example, the virtual volume name which is identified in step 1202 is "V-VOL A." The access type 1102 of "V-VOL A" is "RANDOM" from the row 1103 in the access type definition information 226. In decision step 1204, if the access type 1102 which the disk control program 221 gets in step 1203 is "RANDOM", then the process goes to step 1205; if not, the process goes to step 1209.

In step 1205, the disk control program 221 selects a RAID group to allocate an area to a virtual volume. The disk control program 221 selects a RAID group that has the least amount of assigned capacity 1123 among the objects associated with the virtual volume name 1121 identified in step 1202. For example, when the identified object name is "V-VOL C" in step 1202, "RG C" is the least assigned capacity among "RG A," "RG B," and "RG C." In step 1206, the disk control program 221 selects a logical volume to allocate an area to a virtual volume. The disk control program 221 selects the logical volume name 421 for which the RAID group name 423 is associated with the RAID group that is selected in step 1205. For example, when "RG C" is selected in step 1205, the disk control program 221 selects "L-VOL C." In step 1207, the disk control program 221 allocates an area of the logical volume that is selected in step 1206 to the virtual volume that is specified by the volume name 362 and the volume address 363, and updates the virtual volume information 225.

In step 1209, the disk control program 221 gets the adjacent previous address of the object address specified by the write command 360. For example, the volume name 362 is "V-VOL A" and the volume address 363 is "500" to "599," and hence the adjacent previous address is "400" to "499." In step 1212, the disk control program 221 gets the logical volume name 503 and the logical volume address 504 allocated to the virtual volume and the virtual volume address obtained in step 1209 from the virtual volume information 225. For example, the virtual volume name 501 obtained in step 1209 is "V-VOL A" and the virtual volume address 502 obtained in step 1212 is "400" to "499", and thus the logical volume name 503 is "L-VOL D" and the logical volume address 504 is "100" to "199." In step 1213, the disk control program 221 gets the subsequent address of the logical volume address obtained in step 1212. For example, the logical volume name 503 is "L-VOL D" and the logical volume address 504 is "100" to "199" obtained in step 1212, and hence the adjacent subsequent address is "200" to "299." In step 1214, the disk control program 221 allocates the area obtained in step 1213 to the virtual volume specified by the volume name 362 and the volume address 363.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the allocation of an area of logical volume to a virtual volume. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a processor;
   a memory;
   a disk control module configured to receive a write command for writing to an unallocated area and to identify an object of the write command to be written as a written object; and
   an object allocation acquisition module configured to obtain object allocation information specifying one or more virtual volume locations for storing the written object;
   wherein the disk control module allocates, to each of the one or more virtual volume locations, an area selected from a plurality of logical volumes if the written object is predefined as a randomly accessed object; and
   wherein the disk control module allocates to the one or more virtual volume locations a consecutive area of one logical volume if the written object is predefined as a sequentially accessed object.

2. The storage system according to claim 1,
   wherein the disk control module is configured to update virtual volume information correlating one or more logical volume locations of the allocated area with the one or more virtual volume locations for storing the written object.

3. The storage system according to claim 1,
   wherein the one or more logical volume locations include a logical volume name and one or more logical volume addresses, and wherein the one or more virtual volume locations include a virtual volume name and one or more virtual volume addresses.

4. The storage system according to claim 1, wherein the disk control module is configured to
   obtain the one or more virtual volume locations for storing the written object from the object allocation information;
   obtain one or more logical volume locations corresponding to the obtained one or more virtual volume locations based on virtual volume information;
   obtain one or more RAID group names and addresses corresponding to the obtained one or more logical volume locations based on logical volume information;
   obtain a media name corresponding to the obtained one or more RAID group names and addresses based on RAID group information; and
   write data of the write command to media corresponding to the obtained media name.

5. The storage system according to claim 1,
   wherein the disk control module is configured to obtain the one or more virtual volume locations for storing the written object from the object allocation information, obtain one or more logical volume locations corresponding to the one or more virtual volume locations based on virtual volume information, and obtain one or more RAID group names and addresses corresponding to the obtained one or more logical volume locations based on logical volume information;
   wherein if the written object is predefined as a randomly accessed object, then for the area to be allocated to each one of the one or more virtual volume locations, the disk control module selects from the one or more RAID group names and addresses a RAID group which has a least amount of assigned capacity, selects a logical volume which is associated with the selected RAID group, and allocates a portion of the selected logical volume as the selected area to the one virtual volume location;
   wherein if the written object is predefined as a sequentially accessed object and if the disk control module finds a virtual volume name and virtual volume address of an adjacent previous address of an object address of the written object, the disk control module obtains the virtual volume name and virtual volume address of the adjacent previous address from the object allocation information, obtains a logical volume name and a logical volume address allocated to the virtual volume name and the virtual volume address of the adjacent previous address, obtains an adjacent subsequent address of the logical volume address of the adjacent previous address, and allocates an area of the adjacent subsequent address as the consecutive area of one logical volume to the one or more virtual volume locations for storing the written object; and
   wherein if the written object is predefined as a sequentially accessed object and if the disk control module does not find a virtual volume name and virtual volume address of an adjacent previous address of an object address of the written object, the disk control module allocates an area of a logical volume of a RAID group for which an access type is SEQUENTIAL.

6. The storage system according to claim 1, further comprising a move module;
   wherein an access type of the written object is changed to a changed object from a randomly accessed object to a sequentially accessed object or from a sequentially accessed object to a randomly accessed object;

wherein if the access type of the changed object is changed from a sequentially accessed object to a randomly accessed object, the changed object has an object name and a plurality of object addresses, and for each object address of the object addresses of the changed object, the move module obtains the virtual volume name and the virtual volume address corresponding to the object name and the object address of the changed object, obtains the logical volume name and the logical volume address corresponding to the obtained virtual volume name and the virtual volume address, obtains one or more RAID group names and addresses corresponding to the obtained logical volume name and the logical volume address, selects from the one or more RAID group names and addresses a RAID group which has a least amount of assigned capacity, selects a logical volume for random access which is associated with the selected RAID group, and moves data from an area associated with the obtained logical volume name and the logical volume address of the changed object to the selected logical volume for random access; and wherein if the access type of the changed object is changed from a randomly accessed object to a sequentially accessed object, the move module selects a RAID group for which the access type is SEQUENTIAL, selects a logical volume for which a RAID group name is associated with the selected RAID group, obtains a source address of the changed object based on the object allocation information and on virtual volume information which correlates virtual volume name and address with logical volume name and address, and moves data from the source address to the selected logical volume.

7. A storage system comprising:
a processor;
a memory;
a disk control module configured to receive a write command for writing to an unallocated area and to identify a target volume for an object of the write command to be written as a written object; and
an object allocation acquisition module configured to obtain object allocation information specifying one or more virtual volume locations for storing the written object;
wherein the disk control module allocates, to each of the one or more virtual volume locations, an area selected from a plurality of logical volumes if the target volume is predefined as a randomly accessed volume; and
wherein the disk control module allocates to the one or more virtual volume locations a consecutive area of one logical volume if the target volume is predefined as a sequentially accessed volume.

8. The storage system according to claim 7,
wherein the disk control module is configured to update virtual volume information correlating one or more logical volume locations of the allocated area with the one or more virtual volume locations for storing the written object.

9. The storage system according to claim 7,
wherein the one or more logical volume locations include a logical volume name and one or more logical volume addresses, and wherein the one or more virtual volume locations include a virtual volume name and one or more virtual volume addresses.

10. The storage system according to claim 7, wherein the disk control module is configured to obtain the one or more virtual volume locations for storing the written object from the object allocation information;
obtain one or more logical volume locations corresponding to the obtained one or more virtual volume locations based on virtual volume information;
obtain one or more RAID group names and addresses corresponding to the obtained one or more logical volume locations based on logical volume information;
obtain a media name corresponding to the obtained one or more RAID group names and addresses based on RAID group information; and
write data of the write command to media corresponding to the obtained media name.

11. The storage system according to claim 7,
wherein the disk control module is configured to obtain the one or more virtual volume locations for storing the written object from the object allocation information, obtain one or more logical volume locations corresponding to the obtained one or more virtual volume locations based on virtual volume information, and obtain one or more RAID group names and addresses corresponding to the obtained one or more logical volume locations based on logical volume information;
wherein if the target volume is predefined as a randomly accessed volume, then for the area to be allocated to each one of the one or more virtual volume locations, the disk control module selects from the one or more RAID group names and addresses a RAID group which has a least amount of assigned capacity, selects a logical volume which is associated with the selected RAID group, and allocates a portion of the selected logical volume as the selected area to the one virtual volume location;
wherein if the target volume is predefined as a sequentially accessed volume, the disk control module obtains the virtual volume name and virtual volume address of the adjacent previous address from the object allocation information, obtains a logical volume name and a logical volume address allocated to the virtual volume name and the virtual volume address of the adjacent previous address, obtains an adjacent subsequent address of the logical volume address of the adjacent previous address, and allocates an area of the adjacent subsequent address as the consecutive area of one logical volume to the one or more virtual volume locations for storing the written object.

12. A storage system comprising:
a processor;
a memory;
a disk control module configured to receive a write command for writing to an unallocated area, and to identify an object of the write command to be written as a written object or a target volume for an object of the write command to be written as a written object; and
an object allocation acquisition module configured to obtain object allocation information specifying one or more virtual volume locations for storing the written object;
wherein if the disk control module identifies a written object of the write command, the disk control module allocates to the one or more virtual volume locations an area having portions selected from a plurality of logical volumes if the written object is predefined as a randomly accessed object, and allocates to the virtual volume location a consecutive area of one logical volume if the written object is predefined as a sequentially accessed object; and wherein if the disk control module identifies a written object of the write command, the disk control module allocates, to each of the one or more virtual volume locations, an area selected from a plurality of logical volumes if the written object is predefined as a randomly accessed object, and the disk control module allocates to the one or more virtual volume locations a consecutive area of one logical volume if the written object is predefined as a sequentially accessed object; and wherein if the disk control module identifies a target volume for a written object of the write command, the disk control module allocates, to each of the one or more virtual volume locations, an area selected from a plurality of logical volumes if the target volume is predefined as a randomly accessed volume, and the disk control module allocates to the one or more virtual volume locations a consecutive area of one logical volume if the target volume is predefined as a sequentially accessed volume.

13. The storage system according to claim 12, wherein the disk control module is configured to update virtual volume information correlating the one or more logical volume locations of the allocated area with the one or more virtual volume locations for storing the written object.

14. The storage system according to claim 12, wherein the one or more logical volume locations include a logical volume name and one or more logical volume addresses, and wherein the one or more virtual volume locations include a virtual volume name and one or more virtual volume addresses.

15. The storage system according to claim 12, wherein the disk control module is configured to obtain the one or more virtual volume locations for storing the written object from the object allocation information;

obtain one or more logical volume locations corresponding to the obtained one or more virtual volume locations based on virtual volume information;

obtain one or more RAID group names and addresses corresponding to the obtained one or more logical volume locations based on logical volume information;

obtain a media name corresponding to the obtained one or more RAID group names and addresses based on RAID group information; and write data of the write command to media corresponding to the obtained media name.

16. The storage system according to claim 12, wherein if the disk control module identifies a written object of the write command, then the disk control module is configured to obtain the one or more virtual volume locations for storing the written object from the object allocation information, obtain one or more logical volume locations corresponding to the obtained one or more virtual volume locations based on virtual volume information, and obtain one or more RAID group names and addresses corresponding to the obtained one or more logical volume locations based on logical volume information;

if the written object is predefined as a randomly accessed object, then for the area to be allocated to each one of the one or more virtual volume locations, the disk control module selects from the one or more RAID group names and addresses a RAID group which has a least amount of assigned capacity, selects a logical volume which is associated with the selected RAID group, and allocates a portion of the selected logical volume as the selected area to the one virtual volume location;

if the written object is predefined as a sequentially accessed object and if the disk control module finds a virtual volume name and virtual volume address of an adjacent previous address of an object address of the written object, the disk control module obtains the virtual volume name and virtual volume address of the adjacent previous address from the object allocation information, obtains a logical volume name and a logical volume address allocated to the virtual volume name and the virtual volume address of the adjacent previous address, obtains an adjacent subsequent address of the logical volume address of the adjacent previous address, and allocates an area of the adjacent subsequent address as the consecutive area of one logical volume to the one or more virtual volume locations for storing the written object; and if the written object is predefined as a sequentially accessed object and if the disk control module does not find a virtual volume name and virtual volume address of an adjacent previous address of an object address of the written object, the disk control module allocates an area of a logical volume of a RAID group for which an access type is SEQUENTIAL; and wherein if the disk control module identifies a target volume for a written object of the write command, then the disk control module is configured to obtain the one or more virtual volume locations for storing the written object from the object allocation information, obtain one or more logical volume locations corresponding to the obtained one or more virtual volume locations based on virtual volume information, and obtain one or more RAID group names and addresses corresponding to the obtained one or more logical volume locations based on logical volume information;

if the target volume is predefined as a randomly accessed volume, then for the area to be allocated to each one of the one or more virtual volume locations, the disk control module selects from the one or more RAID group names and addresses a RAID group which has a least amount of assigned capacity, selects a logical volume which is associated with the selected RAID group, and allocates a portion of the selected logical volume as the selected area to the one virtual volume location; and if the target volume is predefined as a sequentially accessed volume, the disk control module obtains the virtual volume name and virtual volume address of the adjacent previous address from the object allocation information, obtains a logical volume name and a logical volume address allocated to the virtual volume name and the virtual volume address of the adjacent previous address, obtains an adjacent subsequent address of the logical volume address of the adjacent previous address, and allocates an area of the adjacent subsequent address as the consecutive area of one logical volume to the one or more virtual volume locations for storing the written object.

17. The storage system according to claim 12, further comprising a move module; wherein the disk control module identifies a written object of the write command;

an access type of the written object is changed to a changed object from a randomly accessed object to a sequentially accessed object or from a sequentially accessed object to a randomly accessed object;

if the access type of the changed object is changed from a sequentially accessed object to a randomly accessed object, the changed object has an object name and a plurality of object addresses, and for each object address of the object addresses of the changed object, the move module obtains the virtual volume name and the virtual volume address corresponding to the object name and the object address of the changed object, obtains the logical volume name and the logical volume address corresponding to the obtained virtual volume name and the virtual volume address, obtains one or more RAID group names and addresses corresponding to the obtained logical volume name and the logical volume address, selects from the one or more RAID group names and addresses a RAID group which has a least amount of assigned capacity, selects a logical volume for random access which is associated with the selected RAID group, and moves data from an area associated with the obtained logical volume name and the logical volume address of the changed object to the selected logical volume for random access; and if the access type of the changed object is changed from a randomly accessed object to a sequentially accessed object, the move module selects a RAID group for which the access type is SEQUENTIAL, selects a logical volume for which a RAID group name is associated with the selected RAID group, obtains a source address of the changed object based on the object allocation information and on virtual volume information which correlates virtual volume name and address with logical volume name and address, and moves data from the source address to the selected logical volume.

\* \* \* \* \*